June 22, 1954

R. T. COLLETT 2,681,499

BUFFING ATTACHMENT

Filed Dec. 18, 1951

Ray T. Collett
INVENTOR.

BY *Clarence A. O'Brien
and Harvey B. Jacobson*
Attorneys

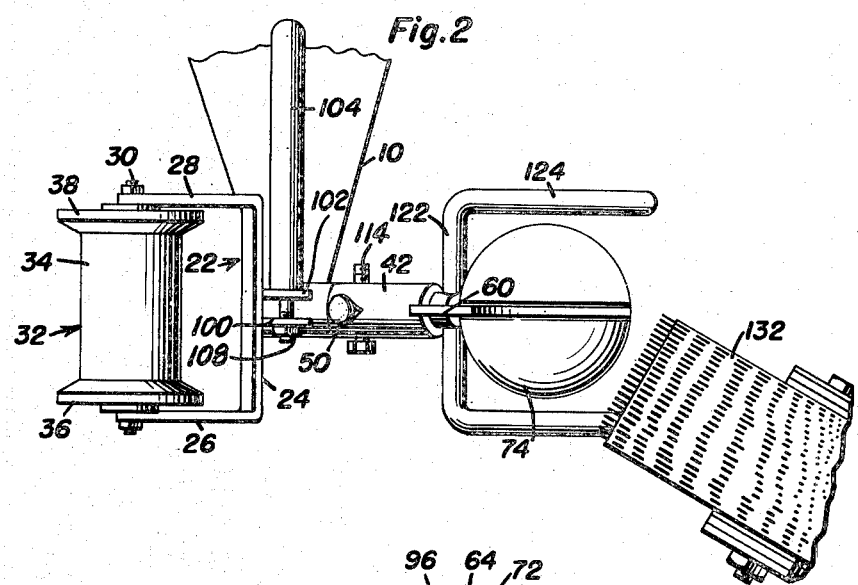
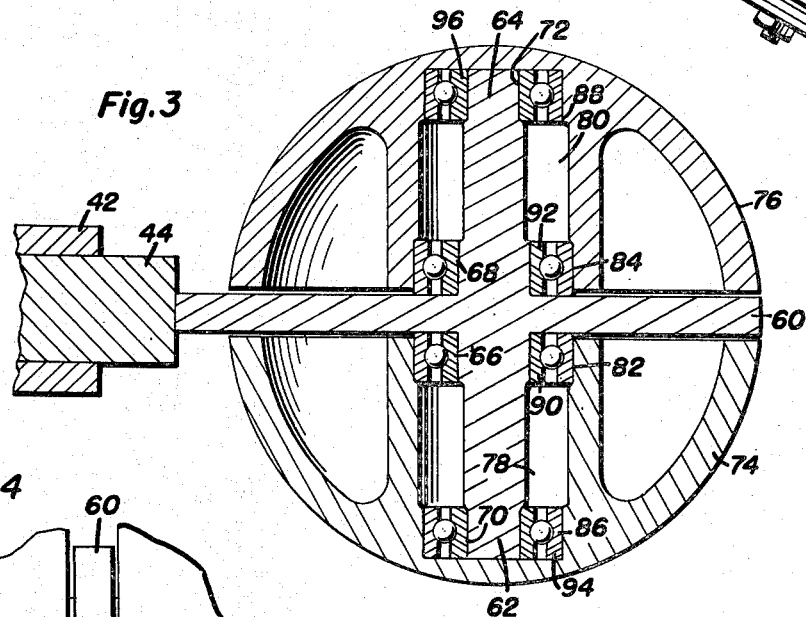
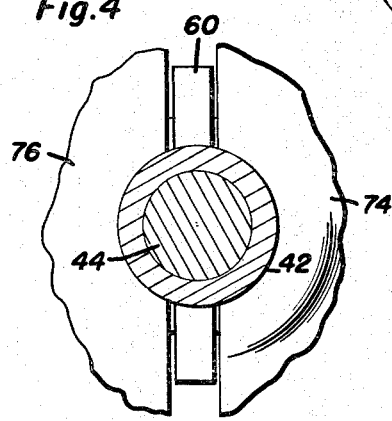

Patented June 22, 1954

2,681,499

UNITED STATES PATENT OFFICE 2,681,499

BUFFING ATTACHMENT

Ray T. Collett, Fortuna, Calif.

Application December 18, 1951, Serial No. 262,268

4 Claims. (Cl. 29—76)

This invention relates to a buffing attachment and particularly to an attachment for buffing tires for retreading or resurfacing.

In the preparation of tire carcasses for retreading it is necessary to trim off the old tread and clean the tire down to the fabric. This is usually accomplished by presenting the surface of the tire to a buffing wheel or a plurality of buffing wheels to cut off and remove the surplus material from the surface of the tire. Such buffing operation is a somewhat dangerous and very tedious operation in that the tire must be completely cleaned while presented to a rapidly revolving rough surface which may grab the tire out of the hand of the operator and endanger the operator and possibly damage the tire. Various stands have been proposed heretofore for a tire while the surface is being buffed. All the stands of which I am familiar have the defect that the surface of the tire is not rigidly held so that considerable difficulty is had in removing all of the material from the surface.

According to this invention, a pair of shoes is provided which are mounted inside of the tire carcass so that the surface of the tire is rigidly supported in proper shape to be presented to the buffing wheel so that all of the extraneous material may be quickly and easily removed therefrom. The present invention provides a pair of rollers of which one shoe contacts the bead edge of the tire and the other distendingly contacts the inside of the tire so that it may be rotated against a pair of buffing wheels for quickly and expeditiously removing the surplus non-wanted material from the surface of the tire carcass.

It is accordingly an object of my invention to provide an improved buffing attachment.

It is a further object of this invention to provide a buffing attachment which fully supports the inside of the tire carcass undergoing buffing.

It is a further object of this invention to provide a buffing attachment for safely and rapidly removing the exterior material from the tire carcass.

It is a further object of this invention to provide a buffing attachment having guides to prevent excessive buffing of the tire surface.

Other objects and many of the attentive advantages will be apparent from the following detailed description taken in conjunction with the accompanying drawing in which:

Figure 2 is a top plan view of the buffing attachment showing the relation to the buffing wheel;

Figure 3 is an enlarged section through the inside tire guide taken substantially on the plane indicated by the line 3—3 of Figure 1;

Figure 4 is an enlarged cross sectional view taken substantially on the plane indicated by the line 4—4 of Figure 1 and showing the tubular arm and cylindrical adjustable member;

Figure 1:
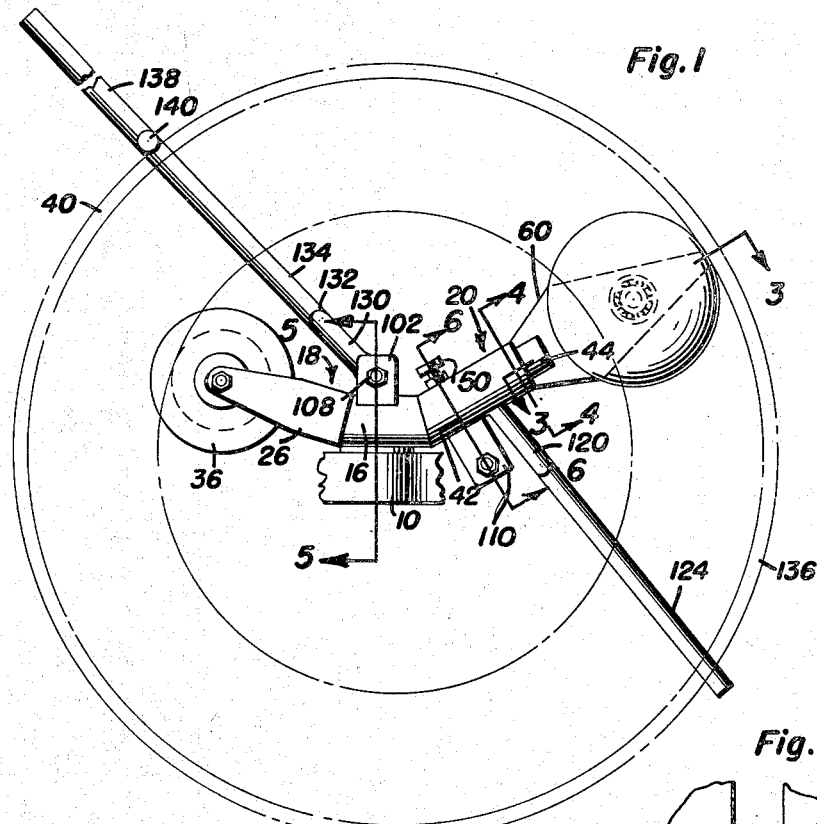
Figure 1 is a side elevation of the buffing attachment according to this invention showing the location of a tire on the guide.
Figure 5:
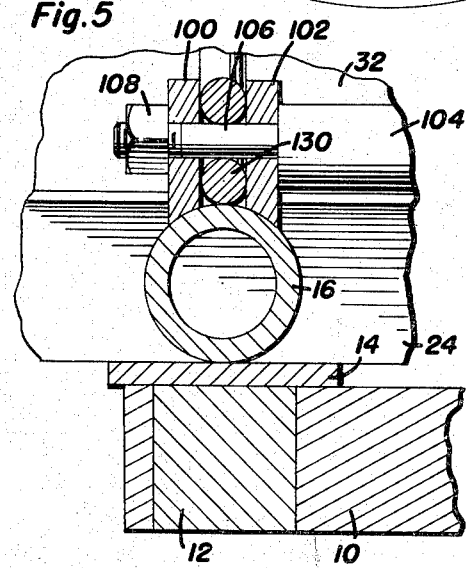
Figure 6:
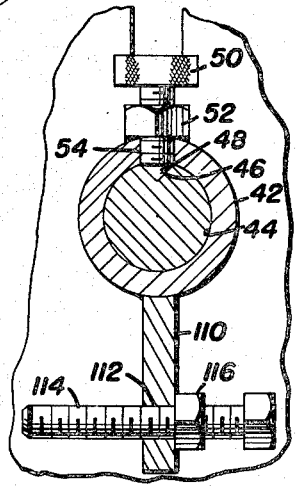

Figure 5 is a vertical section taken substantially on the plane indicated by the line 5—5 of Figure 1 and shows the standard or journal for the buffing attachment and the method of connecting the control handle thereto, and Figure 6 is a cross section through the adjustable arm taken substantially on the line 6—6 of Figure 1 showing the method of holding the adjustable member in position and showing the adjustable guide for preventing excessive side removal of the material from the carcass.

In the exemplary embodiment of the invention a bracket 10 has mounted thereon by means of a stud 12 having a top bearing plate 14, a central body member 16 on which is mounted a pair of angularly extending radially directed arms 18 and 20. The arm 18 comprises a substantially U-shaped member 22 having a web 24 and outwardly projecting arms 26 and 28 between which is mounted a journal rod 30. Journaled on the journal rod 30 is a flanged roller 32 having a substantially cylindrical mid-portion 34 and upstanding flanges 36 and 38. The roller 32 is adapted to receive the inside beaded edge of the tire 40.

Angularly extending arms 20 comprise a substantially tubular member 42 in which is slidably received a substantially cylindrical member 44. The member 44 is provided with recesses 46 in which is engaged the end 48 of a set screw 50 having a lock nut 52 secured in a hole 54 in the tubular member 42.

Rigidly mounted on the end of the cylinder 44 is a mounting plate 60 which has mounted substantially centrally thereof a pair of upstanding axles 62 and 64. The axles 62 and 64 are substantially identical and diametrically opposite each other and are provided with a plurality of bearing seats 66 and 68 on the ends adjacent the plate 60 and having additional bearing seats 70 and 72 at the extreme ends thereof. A pair of substantially semi-spherical guide shoes 74 and 76 are provided with axial bores 78 and 80 having inner bearing seats 82 and 84 and outer bearing seats 86 and 88 an anti-friction bearing 90 is mounted between the seats 66 and 82 and similar bearings 92 are mounted between the bearing seats 68 and 84. Likewise bearing 94 is received between the bearing seats 70 and 86 while the bearings 96 are received between the bearing seats 72 and 88.

A pair of upstanding ears 100 and 102 are rigidly connected on the body 16 by any suitable means, such as welding. A handle member 104 is rigidly connected to the upstanding ears 100 and 102 by any suitable means such as the pin 106 and the nut 108. Obviously the handle 104 can be of any size and length and extend in any suitable direction to enable the operator to control the operation of the buffing device.

A handle rod 130 is pivotally mounted on the pin 106 between the ears 100 and 102. The handle rod 130 is offset as at 132 to provide a lateral guide rod 134 contacting the side of the tire 136 and terminating in a handle 138. A brake rod 140 is rigidly mounted on the rod 134 and extends in overlying relation to the tire 136. The brake rod 140 can be selectively pressed against the surface of the tire 136 by rotating the rod 134 about the pin 106.

In order to control the extent of swing of the attachment, a depending lug 110 is rigidly attached to the lower side of the tubular member 42 with the lower end of the lug 110 extending into the plane of the bracket 10. The lug 110 is provided adjacent the lower end thereof with a threaded opening 112 in which is threadedly and adjustably mounted a threaded stop rod 114 which is adapted to engage the side of the bracket 10 to limit the inward swing of the attachment. The stop is adjusted by turning the threaded rod 114 in the threaded opening 112 and the rod 114 is locked in adjusted position by a lock nut 116. The stop 114 provides a safety to prevent excessive swinging of the handle 104.

Likewise rigidly secured to the sleeve 42 is a guide rod 120 having a laterally extending portion 122 and one or more offset portions 124 extending adjacent to and adapted to contact the sides of the tire 40.

In the operation of the tire buffing attachment a plurality of semi-cylindrical shoes 74 and 76 of different sizes are provided so that different size tires may be utilized on the device and properly distended thereby. Having supplied the proper size shoes 74 and 76 inside the carcass and distending the same into even smoothness, the bead edge of the tire 40 is supported on the roller 32 and the buffing attachment presented to a buffing wheel 132. Stop pin 114 is regulated so that the end of the pin strikes the arm 10 to prevent excessive side removal of material from the carcass. Contact with the buffing wheel 132 rotates the tire 136 in contact with the buffing wheel and the guide rods 124 making contact with the sides of the tire prevent side sway and applied a slight braking effect to the rotation of the tire. The entire stand is controlled or oscillated by means of the handle 104 so that a comparatively uniform operation occurs over the entire tire surface because of the presence of the spherical shoes within the tire carcass.

For purposes of exemplification a specific embodiment of the invention has been shown and described according to the best present understanding thereof, it is apparent that many changes and modifications can be made therein, without departing from the true spirit of the invention.

Having described the invention, what is claimed as new is:

1. A tire buffing stand comprising a rotatably mounted body, a U-shaped bracket angularly secured on said body, a flanged roller journaled in said U-shaped bracket, a tubular arm rigidly secured on said body, a cylindrical member adjustably secured in said arm, a mounting plate rigidly mounted on said cylindrical member, a pair of matching semi-spherical shoes detachably journaled on said plate, a handle rigidly mounted on said body.

2. A tire buffing stand comprising a rotatably mounted body, a U-shaped bracket angularly secured on said body, a flanged roller journaled in said U-shaped bracket, a tubular arm rigidly secured on said body, a cylindrical member adjustably secured in said arm, a mounting plate rigidly mounted on said cylindrical member, a pair of matching semi-spherical shoes journaled on said plate, a guide rod rigidly mounted on said tubular arm.

3. A tire buffing stand comprising a bracket, a body member journaled on said bracket for oscillation about a vertical axis, a pair of angularly extending arms on said body, a flanged roller mounted on one of said arms for rotation about a horizontal axis, said second arm including a tubular member, an extensible member adjustably secured in said tubular member, a mounting plate rigidly secured on said extensible member, a pair of freely rotating shoes mounted on said plate, a depending lug welded on said tubular member, a stop screw adjustably mounted in said lug and engageable with said bracket.

4. A tire buffing stand comprising a bracket, a body member journaled on said bracket for swinging motion about a vertical axis, a pair of angularly extending arms on said body, a flanged roller mounted on one of said arms for rotation about a horizontal axis, said second arm including a tubular member, an extensible member adjustably secured in said tubular member, a mounting plate rigidly secured on said extensible member, a pair of freely rotating shoes mounted on said plate, control means rigidly mounted on said body.

References Cited in the file of this patent

UNITED STATES PATENTS

| Number | Name | Date |
| --- | --- | --- |
| 1,745,021 | Liebau | Jan. 28, 1930 |
| 1,945,883 | Connelly | Feb. 6, 1934 |
| 2,023,575 | Connelly | Dec. 10, 1935 |
| 2,085,650 | Godfrey, Jr. | June 29, 1937 |
| 2,086,254 | Browning | July 6, 1937 |
| 2,087,304 | Sawyer | July 20, 1937 |
| 2,160,143 | Hayton | May 30, 1939 |
| 2,189,203 | Glynn | Feb. 6, 1940 |
| 2,498,953 | Glynn | Feb. 28, 1950 |

FOREIGN PATENTS

| Number | Country | Date |
| --- | --- | --- |
| 173,595 | Switzerland | Feb. 16, 1935 |